US012658597B2

(12) United States Patent
Moon et al.

(10) Patent No.: US 12,658,597 B2
(45) Date of Patent: Jun. 16, 2026

(54) ANTENNA ASSEMBLY INCLUDING A FEED LINE HAVING AIR-STRIP STRUCTURE AND AN ANTENNA DEVICE USING THE SAME

(71) Applicant: KMW INC., Hwaseong-si (KR)

(72) Inventors: Young Chan Moon, Suwon-si (KR); Sung Hwan So, Hwaseong-si (KR); Oh Seog Choi, Hwaseong-si (KR); Seong Man Kang, Hwaseong-si (KR); Hyoung Seok Yang, Hwaseong-si (KR); Yong Won Seo, Hwaseong-si (KR); Myung Hwa Kim, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 278 days.

(21) Appl. No.: 18/201,753

(22) Filed: May 24, 2023

(65) Prior Publication Data

US 2023/0299503 A1 Sep. 21, 2023

Related U.S. Application Data

(63) Continuation of application No. PCT/KR2021/017545, filed on Nov. 25, 2021.

(30) Foreign Application Priority Data

Nov. 25, 2020 (KR) ........................ 10-2020-0160429
Nov. 25, 2021 (KR) ........................ 10-2021-0164484

(51) Int. Cl.
*H01Q 21/00* (2006.01)
*H01Q 1/24* (2006.01)
(Continued)

(52) U.S. Cl.
CPC ......... *H01Q 21/0081* (2013.01); *H01Q 1/523* (2013.01); *H01Q 9/0414* (2013.01);
(Continued)

(58) Field of Classification Search
CPC .......... H01Q 1/002; H01Q 1/246; H01Q 1/42; H01Q 1/52; H01Q 1/521; H01Q 1/523;
(Continued)

(56) References Cited

U.S. PATENT DOCUMENTS 6,462,710 B1 10/2002 Carson et al.
10,511,088 B2 * 12/2019 Xiao .................... H01Q 19/108
(Continued)

FOREIGN PATENT DOCUMENTS

CN 211376931 U 8/2020
CN 213093372 U * 4/2021
(Continued)

OTHER PUBLICATIONS

Non-final Office Action mailed on May 7, 2024 from the Japanese Patent Office for Japanese Application No. 2023-530795 and its English translation.
(Continued)

*Primary Examiner* — Robert Karacsony

(57) ABSTRACT

An antenna device is provided. The antenna device includes a base; an antenna group including a plurality of radiating elements disposed on the base along a first direction; and a feed line configured to feed power to the plurality of radiating elements, the feed line having an air-strip structure, wherein the feed line includes: a plurality of connection line regions configured such that one end is connected to each radiating element of the plurality of radiating elements, and a main line region bent at a predetermined angle at the other end of the connection line region and formed along the first direction from a side surface of the antenna group.

13 Claims, 10 Drawing Sheets

13

(51) Int. Cl.

| | |
|---|---|
| ***H01Q 1/52*** | (2006.01) |
| ***H01Q 9/04*** | (2006.01) |
| ***H01Q 21/06*** | (2006.01) |
| ***H01Q 21/24*** | (2006.01) |

(52) U.S. Cl.
CPC ........... *H01Q 21/065* (2013.01); *H01Q 21/24* (2013.01); *H01Q 1/246* (2013.01)

(58) Field of Classification Search
CPC ...... H01Q 1/525; H01Q 1/526; H01Q 9/0414; H01Q 21/0006; H01Q 21/0025; H01Q 21/0075; H01Q 21/0081; H01Q 21/06; H01Q 21/061; H01Q 21/065; H01Q 21/08; H01Q 21/24
See application file for complete search history.

(56) References Cited

U.S. PATENT DOCUMENTS

| | | | | |
|---|---|---|---|---|
| 2002/0135527 | A1 | 9/2002 | Teillet et al. | |
| 2004/0183739 | A1 * | 9/2004 | Bisiules | H01Q 5/378 343/793 |
| 2010/0177012 | A1 | 7/2010 | Morrow | |
| 2018/0248256 | A1 | 8/2018 | Xiao et al. | |

FOREIGN PATENT DOCUMENTS

| | | | |
|---|---|---|---|
| JP | 2003-115715 | A | 4/2003 |
| JP | 2013-219723 | A | 10/2013 |
| JP | 2015-091059 | A | 5/2015 |
| JP | 2016-178526 | A | 10/2016 |
| JP | 2017-098850 | A | 6/2017 |
| KR | 10-2001-0046336 | A | 6/2001 |
| KR | 2001-0046336 | A | 6/2001 |
| KR | 10-2006-0059437 | A | 6/2006 |
| WO | 2019/183665 | A1 | 10/2019 |

OTHER PUBLICATIONS

International Search Report mailed Mar. 8, 2022 for International Application No. PCT/KR2021/017545 and its English translation.
European Search Report dated Nov. 13, 2024 for Application No. 21898644.6.
Chinese Office Action dated Nov. 17, 2025 from State Intellectual Property Office for Application No. 202180078314.1 and its English translation.

* cited by examiner

ANTENNA ASSEMBLY INCLUDING A FEED LINE HAVING AIR-STRIP STRUCTURE AND AN ANTENNA DEVICE USING THE SAME

CROSS-REFERENCE TO RELATED APPLICATION

This application is a continuation application of International Application No. PCT/KR2021/017545, filed Nov. 25, 2021, which claims priority to Patent Application No. 10-2020-0160429, filed on Nov. 25, 2020 in Korea, and Patent Application No. 10-2021-0164484, filed on Nov. 25, 2021 in Korea, the entire contents of which are incorporated herein by reference.

TECHNICAL FIELD

The present disclosure relates to an antenna assembly including a feed line having an air-strip structure and an antenna device using the same.

BACKGROUND ART

The contents described in this part simply provide background information for the present disclosure and do not constitute prior art.

A configuration of an array antenna is largely composed of a radiating element and a feed line for feeding power to the radiating element. A size of the radiating element may vary depending on a use frequency. For example, as an operating frequency increases, the size of the radiating element decreases.

A feed line may be largely divided into an RF cable and a PCB type. The size of the transmission line in the form of the RF cable and the PCB type does not change depending on the operating frequency. That is, even if the operating frequency increases, the size of the feed line is similar.

Meanwhile, loss in the feed line can be divided into a conductor loss in a conductor through which a signal flows and a dielectric loss due to a dielectric surrounding the conductor. The losses directly degrade a gain of the antenna. In order to improve the gain of the antenna, it is necessary to improve the loss part, but it is more effective to improve the dielectric loss part that is advantageous in changing or transforming a medium.

A typical example of a PCB-type transmission line used to improve the dielectric loss part is an air-strip structure. The air-strip structure means a structure in which a dielectric part is implemented with air in a general strip-line structure.

A transmission line with an air-strip structure has a dielectric loss close to "0" because the conductor is surrounded by air. Therefore, when the transmission line is implemented as an air-strip, dielectric loss can be reduced, and through this, the gain of the antenna can be increased.

However, when the air-strip structure is designed with the same impedance, a width of the transmission line becomes wider. Therefore, the transmission line of the air-strip structure has a relatively large area compared to the size of the radiating element. In addition, as the operating frequency increases, the size of the radiating element decreases, but since the size of the transmission line is the same, a relative area of the transmission line increases as the operating frequency increases.

When the area of the transmission line increases, the amount of interference between the transmission line and the radiating element may increase, and in this case, radiation characteristics of the antenna and isolation of the dual polarized antenna may also deteriorate. Moreover, in the case of a horizontally arranged antenna, for example, a massive MIMO antenna, the antennas of each column are usually arranged at 0.5 in the horizontal direction, but this arrangement becomes difficult when the area of the transmission line increases.

DISCLOSURE

Technical Problem

Accordingly, the present disclosure has a main purpose of providing an antenna assembly that enables horizontal arrangement of antennas while reducing the amount of interference between a feed line having an air-strip structure and a radiating element.

Technical Solution

According to an embodiment of the present disclosure, an antenna assembly is provided, An antenna assembly comprising: a base; an antenna group including a plurality of radiating elements disposed on the base along a first direction; and a feed line configured to feed power to the plurality of radiating elements, the feed line having an air-strip structure, wherein the feed line includes: a plurality of connection line regions configured such that one end is connected to each radiating element of the plurality of radiating elements, and a main line region bent at a predetermined angle at the other end of the connection line region and formed along the first direction from a side surface of the antenna group.

Advantageous Effects

As described above, according to the present embodiment, it is possible to provide an antenna assembly that enables horizontal arrangement of antennas while reducing the amount of interference between a feed line having an air-strip structure and a radiating element.

MODE FOR DISCLOSURE

Figure 1:
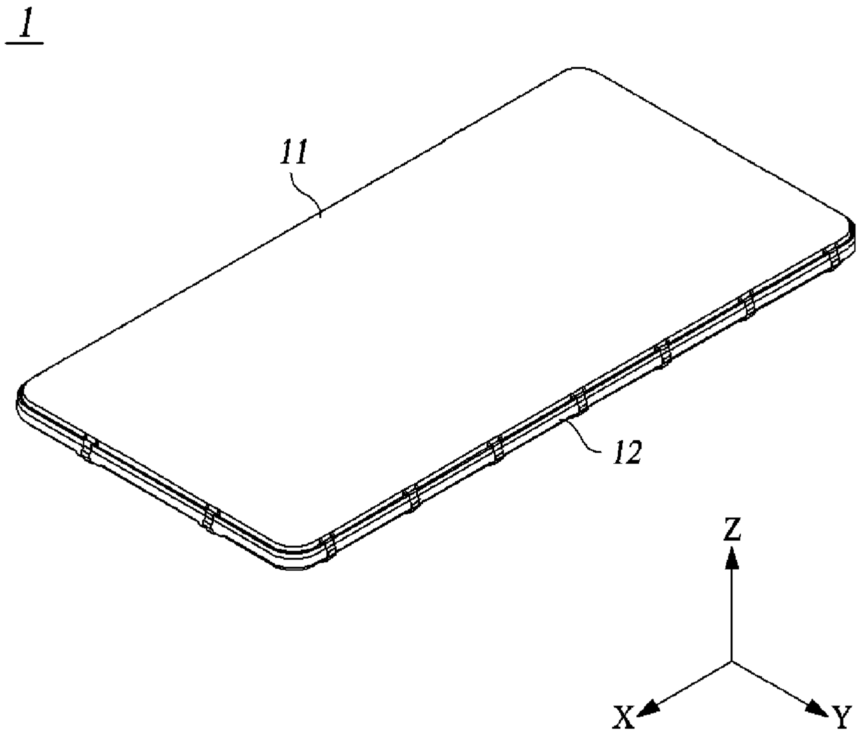
FIG. 1 is a perspective view of an antenna device according to one embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary.

FIG. 1 is a perspective view of an antenna device 1 according to one embodiment of the present disclosure.

Figure 2:
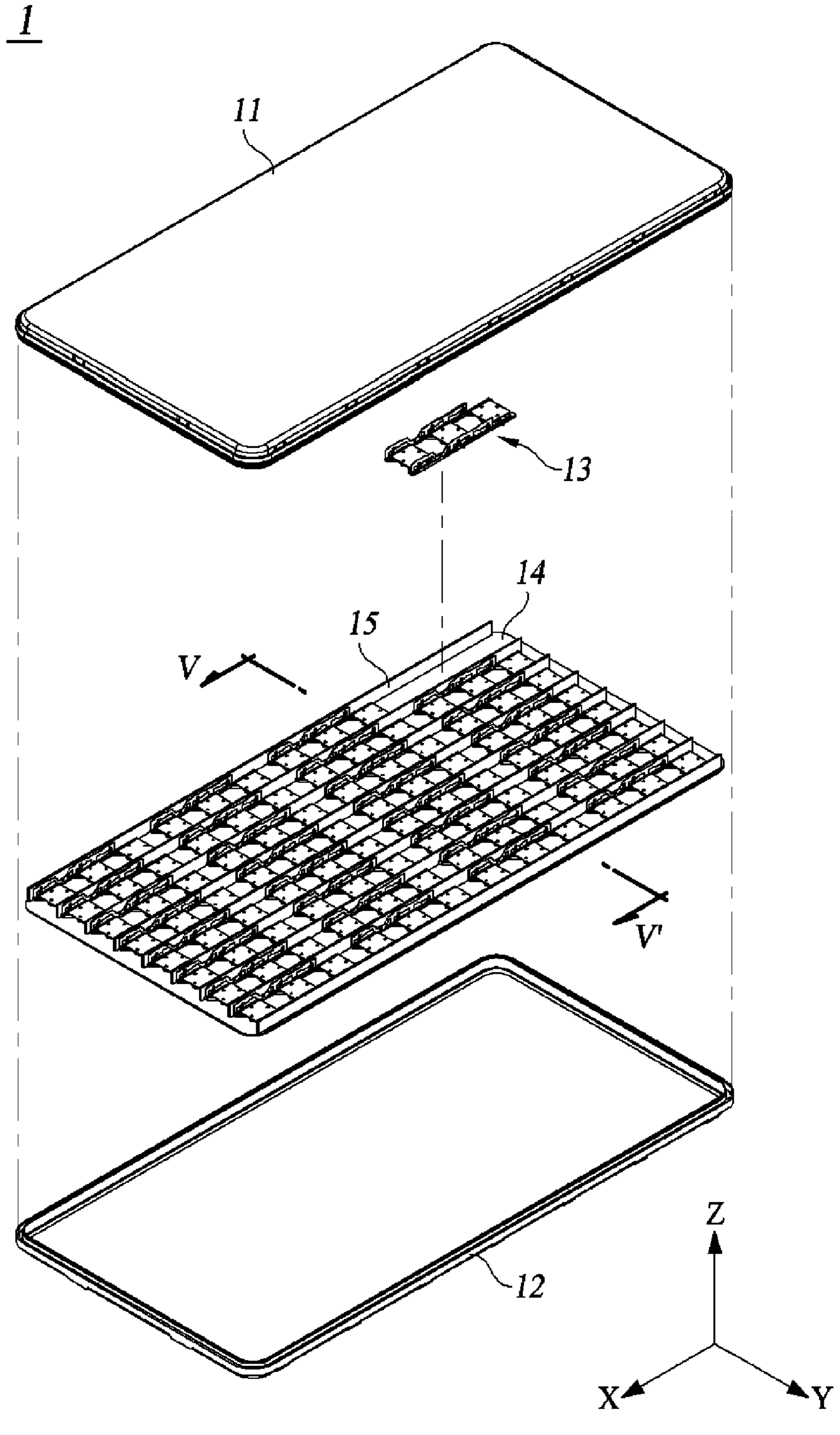
FIG. 2 is an exploded perspective view of the antenna device according to one embodiment of the present disclosure.

FIG. 2 is an exploded perspective view of the antenna device 1 according to one embodiment of the present disclosure.

Referring to FIGS. 1 and 2, the antenna device 1 may include an upper housing 11, a lower housing 12, an antenna assembly 13, a plate 14, and a partition wall 15.

The upper housing 11 and the lower housing 12 may be coupled to each other and may form an external shape of the antenna device 1. The upper housing 11 and the lower housing 12 may define an accommodating space therein, and components such as the antenna assembly 13 may be accommodated in the accommodating space.

The upper housing 11 may be disposed in front of the antenna assembly 13. Accordingly, it is possible to protect the antenna assembly 13 from external shocks and to block external foreign substances from entering the antenna assembly 13. That is, the upper housing 11 may function as a radome of the antenna device 1.

At least one antenna assembly 13 may be modularized and seated on the plate 14. When the antenna assembly 13 is modularized, maintenance for each antenna assembly 13 is facilitated, as well as design change of the antenna device 1 may be facilitated.

A plurality of antenna assemblies 13 may be arranged in a line along a first direction. In this case, the plurality of antenna assemblies 13 may form one antenna column. Here, the first direction refers to a length direction of the antenna device 1. For example, the first direction is a direction parallel to an X axis based on FIGS. 1 and 2.

Figure 4:
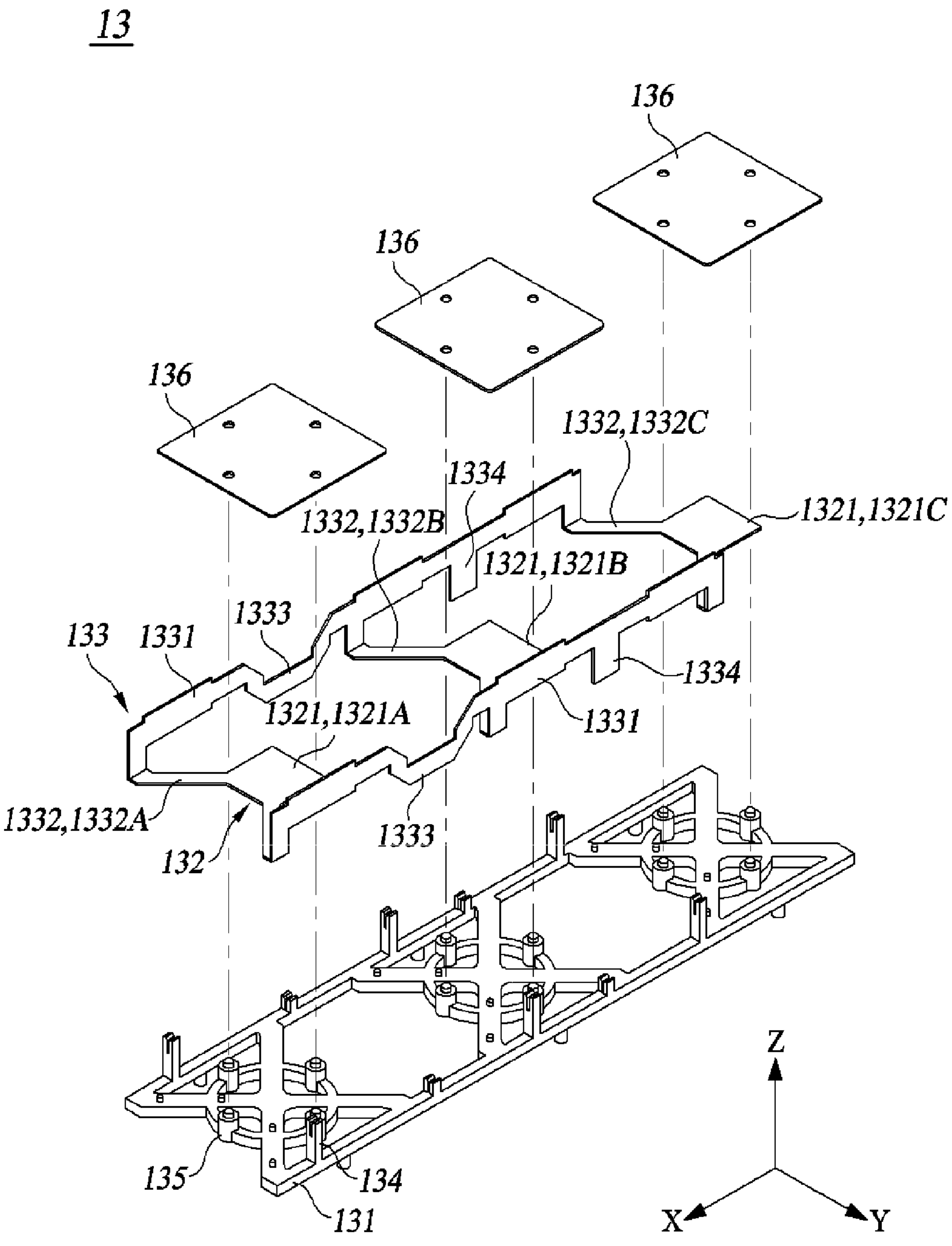
FIG. 4 is an exploded perspective view of the antenna assembly according to one embodiment of the present disclosure.

Since the plurality of antenna assemblies 13 include a plurality of radiating elements in FIG. 4), one antenna column may also include a plurality of radiating elements 1321.

Meanwhile, when an intermediate frequency of an operating frequency band is represented by λ, in one antenna column, in a case where an interval between one radiating element 1321 and the neighboring radiating element 1321 is 1λ or more, an undesirable grating lobe may occur in a radiation pattern.

Therefore, it is preferable that the interval in the first direction between one radiating element 1321 and the neighboring radiating element 1321 is 0.8λ to 0.9λ. However, the present disclosure is not limited thereto, and the interval in the first direction between the two radiating elements 1321 may have a value other than the aforementioned range.

The antenna device 1 may include a plurality of antenna columns. A plurality of antenna columns may be disposed along a second direction perpendicular to the first direction on the plate 14. Here, the second direction refers to a width direction of the antenna device 1. For example, the second direction is a direction parallel to a Y-axis based on FIGS. 1 and 2.

When the intermediate frequency of the operating frequency band is represented by λ, an interval in the second direction between one antenna column and the neighboring antenna column may be 0.5λ, but the present disclosure is not limited thereto.

At least one antenna assembly 13 may be disposed on the plate 14. The plate 14 may be made of a metal material and may provide a ground plane to the radiating element (1321 in FIG. 4) of the antenna assembly 13.

The partition wall 15 may rise from the plate 14 in a direction perpendicular to the plate 14. Specifically, the partition wall 15 may stand in a direction perpendicular to the plate 14, that is, in a direction parallel to a Z-axis of FIGS. 1 and 2.

The partition wall 15 may extend long along the first direction between the two antenna columns. The partition wall 15 may be made of a metal material, and ground planes may be provided on two main line regions (1331 in FIG. 3) adjacent to both side surfaces of the partition wall 15. Details in this regard are described with reference to FIG. 5.

The plate 14 and the partition wall 15 may be integrally formed. For example, the plate 14 and the partition wall 15 may be integrally manufactured through a single mold. However, the present disclosure is not limited thereto, and the plate 14 and the partition wall 15 may be integrally formed through a heat welding method.

Since the plate 14 and the partition wall 15 are integrally formed, generation of a passive intermodulation distortion (PIMD) component caused by bonding between dissimilar metals can be minimized.

Meanwhile, in FIGS. 1 and 2, the lower housing 12 and the plate 14 are illustrated as separate members, but the present disclosure is not limited thereto.

For example, the antenna device 1 may be configured such that the plate 14 functions as the lower housing 12 without a separate member corresponding to the lower housing 12. In this case, by combining the upper housing 11 with the plate 14, it is possible to define an accommodating space therein.

Figure 3:
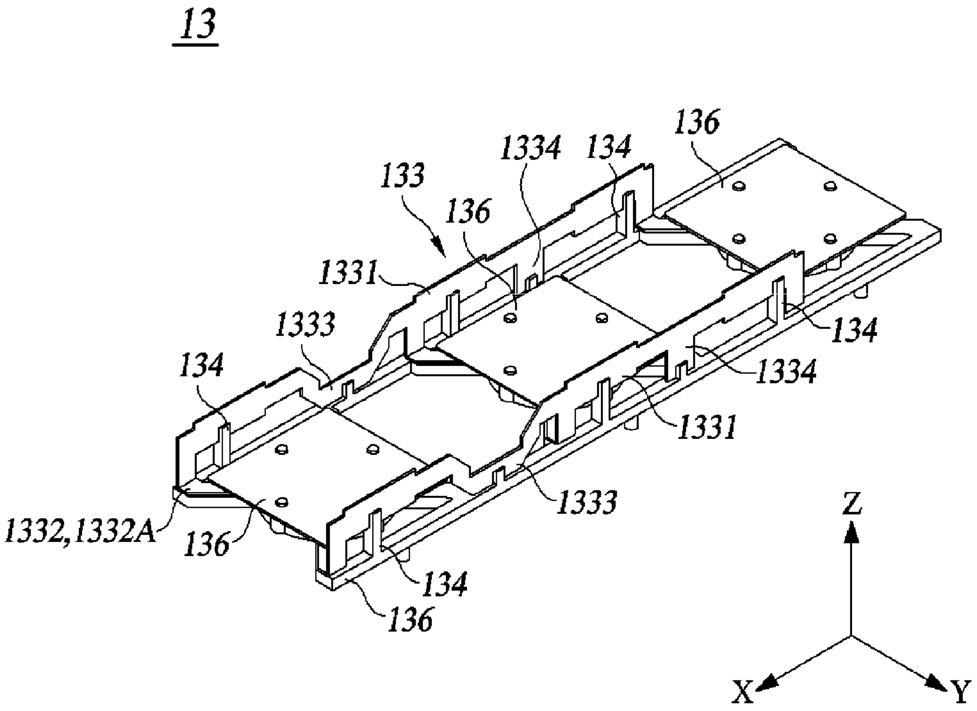
FIG. 3 is a perspective view of an antenna assembly according to one embodiment of the present disclosure.

FIG. 3 is a perspective view of the antenna assembly 13 according to one embodiment of the present disclosure.

FIG. 4 is an exploded perspective view of the antenna assembly 13 according to one embodiment of the present disclosure.

Referring to FIGS. 3 and 4, the antenna assembly 13 may include a base 131, an antenna group 132, a feed line 133, and a director 136.

The base 131 may be seated on the plate 14, and the antenna group 132 and the feed line 133 may be coupled to the base 131.

The base 131 may be made of a dielectric material, for example, a plastic material. The radiating element 1321 needs to be spaced apart from the plate 14 by a certain distance in order to secure radiation characteristics. The base 131 may be disposed between the radiating element 1321 and the plate 14 to separate the radiating element 1321 from the plate 14.

The antenna group 132 may include a plurality of radiating elements 1321 disposed on the base 131 along the first direction. For example, the antenna group 132 may include three radiating elements 1321A, 1321B, and 1321C. However, the present disclosure is not limited thereto, and the antenna group 132 may include two or four or more radiating elements 1321.

Each radiating element 1321 of the plurality of radiating elements 1321 may be configured to implement dual polarization. For example, two types of polarized signals of +45 degrees and −45 degrees may be radiated from one radiating element 1321. However, the present disclosure is not limited thereto, and the radiating element 1321 may be configured to implement single polarization or quadruple polarization.

The feed line 133 may be configured to feed power to the plurality of radiating elements 1321 included in the antenna group 132. That is, the plurality of radiating elements 1321 may transmit/receive a signal or receive power through the feed line 133.

The feed line 133 may have an air-strip structure. The air-strip structure means a structure in which a dielectric part is implemented with air in a general strip-line structure.

In a transmission line having an air-strip structure, a dielectric loss is close to “0” because air is around the conductor. Therefore, when the transmission line is implemented as an air-strip, the dielectric loss can be reduced, and accordingly, a gain of the antenna can be increased.

The feed line 133 may include a main line region 1331, a plurality of connection line regions 1332, and an input/output region 1334.

The main line region 1331 may be disposed on a side surface of the antenna group 132, for example, on both side surfaces of the antenna group 132, and may extend long along the first direction.

The plurality of connection line regions 1332 may have one end connected to the plurality of radiating elements 1321 and the other end connected to the main line region 1331. The main line region 1331 may be bent at a predetermined angle at the other end of the connection line region 1332. For example, the main line region 1331 may be formed in the direction perpendicular to the base 131, that is, in a direction parallel to the Z-axis with reference to FIGS. 3 and 4. However, the present disclosure is not limited thereto, and the main line region 1331 may be formed obliquely with respect to the base 131.

The main line region 1331 may be spaced apart from the partition wall 15. Since the main line region 1331 has an air-strip structure, an empty space may be formed between the main line region 1331 and the partition wall 15.

Meanwhile, the air-strip structure increases the width of the transmission line when designed with the same impedance. Therefore, the transmission line of the air-strip structure has a relatively large area compared to the size of the radiating elements, and accordingly, there is a problem in that it is difficult to narrow the horizontal distance between the radiating elements.

In order to overcome the disadvantages of the air-strip structure, the feed line 133 according to the present disclosure includes a region formed perpendicularly or at a predetermined angle with respect to the base 131, that is, a main line region 1331.

Specifically, the feed line 133 according to one embodiment of the present disclosure forms a main line region 1331 by bending a part of the feed line 1331 of the air-strip structure, and accordingly, it is possible to minimize the region occupied by the feed line 133 on the base 131. Therefore, even when an area of the feed line 133 relative to the radiating element 1321 increases, the distance in the second direction between the radiating elements 1321 can be sufficiently narrowed.

The plurality of connection line regions 1332 may connect the main line region 1331 and the respective radiating elements 1321 of the plurality of radiating elements 1321.

The plurality of connection line regions 1332 may branch from the main line region 1331, and each connection line region 1332 may be connected to the corresponding radiating element 1321. For example, the first, second, and third connection line regions 1332A, 1332B, and 1332C may be respectively connected to the first, second, and third radiating elements 1321A, 1321B, and 1321C.

The plurality of connection line regions 1332 may extend from the main line region 1331 in a bent state. In this case, the plurality of connection line regions 1332 may be parallel to the base 131.

The input/output region 1334 may connect an RF circuit and the main line region 1331.

Specifically, one end of the input/output region 1334 may be connected to the main line region 1331, and the other end of the input/output region 1334 may be connected to the RF circuit provided with a filter, a power amplifier, a power supply unit, and the like.

The RF circuit may be provided inside the antenna device 1, but may also be provided in a device outside the antenna device 1, for example, a remote radio head (RRH). When the RF circuit is provided in an external device such as the RRH, the antenna device 1 and the external device provided with the RF circuit may be connected through an RF cable or connector.

The input/output region 1334 may transmit the signal transmitted from the RF circuit to the plurality of radiating elements 1321 or transmit the signal received from the plurality of radiating elements 1321 to the RF circuit through the main line region 1331 and the connection line region 1332. Moreover, the input/output region 1334 may supply power to the plurality of radiating elements 1321 through the main line region 1331 and the connection line region 1332.

In order to minimize a phase difference or power loss that may occur due to an increase in the length of the transmission line, the input/output region 1334 may be disposed near a middle region of the main line region 1331.

Meanwhile, in the air-strip structure, since the dielectric part is implemented by air, the length of the feed line 133 for inputting the same phase to the plurality of radiating elements 1321 can be relatively long.

For example, when the intermediate frequency of the operating frequency band is represented by λ, the length of the feed line 133 required to input signals of the same phase to the first radiating element 1332A and the second radiating element 1332B may be 1λ. That is, the length of the feed line 133 from the first connection line region 1332A to the second connection line region 1332B may be 1λ.

However, as described above with reference to FIGS. 1 and 2, in order to minimize the occurrence of the grating lobe, the interval in the first direction between the two radiating elements 1321 may have a value of 0.8λ to 0.9λ. In this case, the length of the feed line connecting the two radiating elements 1321 may be longer than the distance between the two radiating elements 1321, which may cause a problem.

To solve this problem, the main line region 1331 may include a delay line 1333. The delay line 1333 is a region formed by bending a part of the main line region 1331, and may partially compensate for the length of the longer feed line 133.

The delay line 1333 may be formed in at least a part of the main line region 1331 connecting the first connection line region 1332A and the second connection line region 1332B.

The delay line 1333 may have a shape recessed toward the base 131 or a shape protruding away from the base 131. For example, the delay line 1333 may have a "c" shape, but the present disclosure is not limited thereto.

Since the main line region 1331 includes the delay line 1333, it is possible to prevent interval in the first direction between the two radiating elements 1321 from being inevitably farther apart. Accordingly, the antenna device 1 can be made more compact, and generation of undesirable grating lobes can be minimized.

Meanwhile, the plurality of radiating elements 1321 may have a patch antenna structure. Since the patch antenna has a relatively low thickness, it may be advantageous to reduce the overall thickness of the antenna device 1.

However, the present disclosure is not limited thereto, and the plurality of radiating elements 1321 may have a structure other than a patch antenna, for example, a dipole antenna structure.

When the plurality of radiating elements 1321 have a patch antenna structure, the plurality of connection line regions 1332 may be integrally formed with the plurality of radiating elements 1321 having a patch antenna structure.

However, the present disclosure is not limited thereto, and the connection line region 1332 and the radiating element 1321 may be configured as separate members. In this case, the connection line region 1332 and the radiating element 1321 may be connected through a separate connection line (not illustrated).

Each director 136 of the plurality of directors 136 may be disposed above each radiating element 1321 of the plurality of radiating elements 1321. The director 136 is disposed in front of the radiating element 1321 in a radial direction, thereby widening an operating frequency band and improving antenna gain.

The antenna assembly 13 may additionally include a first support structure 134 and a second support structure 135.

The main line region 1331 may be supported by at least one first support structure 134.

At least one first support structure 134 is integrally formed with the base 131 and may protrude from the base 131. Specifically, the plurality of first support structures 134 may be disposed along the first direction in regions on both sides of the base 131. That is, the plurality of first support structures 134 may form two columns in regions on both sides of the base 131.

The main line region 1331 has a shape elongated along the first direction. Accordingly, the main line region 1331 may be combined with the plurality of first support structures 134 arranged in a line along the first direction.

A groove for coupling the main line region 1331 may be formed on one end of the first support structure 134. The main line region 1331 may be combined with the first support structure 134 by being inserted into the groove of the first support structure 134.

Since the main line region (1331) has an air-strip structure, it may be vulnerable to fixation. In this respect, the first support structure 134 may serve to firmly fix the main line region 1331 on the base 131.

The plurality of directors 136 may be supported through the second support structure 135.

The plurality of second support structures 135 are integrally formed with the base 131 and may protrude from the base 131.

The plurality of second support structures 135 may be disposed adjacent to the radiating element 1321 or to overlap the radiating element 1321. When the second support structure 135 overlaps the radiating element 1321, the second support structure 135 may pass through the radiating element 1321.

Figure 5:
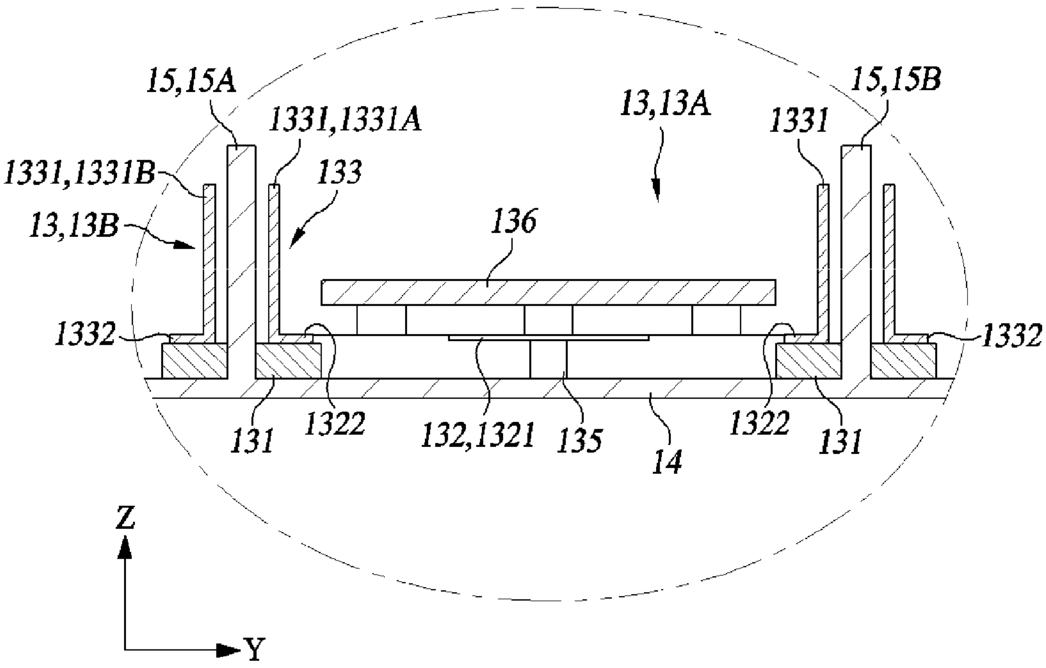
FIG. 5 is a cross-sectional view of the antenna device according to one embodiment of the present disclosure taken along line V-V' of FIG. 2.

FIG. 5 is a cross-sectional view of the antenna device 1 according to one embodiment of the present disclosure taken along line V-V' of FIG. 2.

Referring to FIG. 5, the antenna device 1 may include a first antenna assembly 13A and a second antenna assembly 13B. Here, the first antenna assembly 13A and the second antenna assembly 13B are two arbitrarily designated antenna assemblies 13 adjacent to each other for convenience of description. Therefore, the content described below is not limited to and applied to the antenna assembly 13 at a specific location.

The first antenna assembly 13A and the second antenna assembly 13B may be seated side by side on the plate 14 in the second direction.

The feed line 133 of the first antenna assembly 13A may include a first main line region 1331A adjacent to the second antenna assembly 13B, and the feed line 133 of the second antenna assembly 13B may include a second main line region 1331B adjacent to the first antenna assembly 13A.

The partition wall 15 may rise from the plate 14 between the first antenna assembly 13A and the second antenna assembly 13B. Moreover, the partition wall 15A may be disposed between the first main line region 1331A and the second main line region 1331B.

Since the first main line region 1331A and the second main line region 1331B have an air-strip structure, an empty space may be formed between the partition wall 15A and the first and second main line regions 1331A and 1331B.

The partition wall 15A is disposed between the first main line region 1331A and the second main line region 1331B, thereby providing a ground plane to the first main line region 1331A and the second main line region 1331B at the same time.

The antenna device 1 according to one embodiment of the present disclosure may simultaneously provide a ground plane to two main line regions 1331A and 1331B adjacent to both side surfaces of the partition wall 15A through one partition wall 15A.

As a result, there is an effect of providing higher isolation compared to the case of providing ground planes to each of the two main line regions 1331 using the two partition walls 15.

Another embodiment of the present disclosure illustrated in FIGS. 6 to 7 to be described later has a difference from one embodiment of the present disclosure illustrated in FIGS. 1 to 5 in that the antenna assembly is not modularized. Hereinafter, description will be given focusing on differentiated features from other embodiments of the present disclosure, and repeated descriptions of components substantially the same as those of one embodiment of the present disclosure will be omitted.

Figure 6:
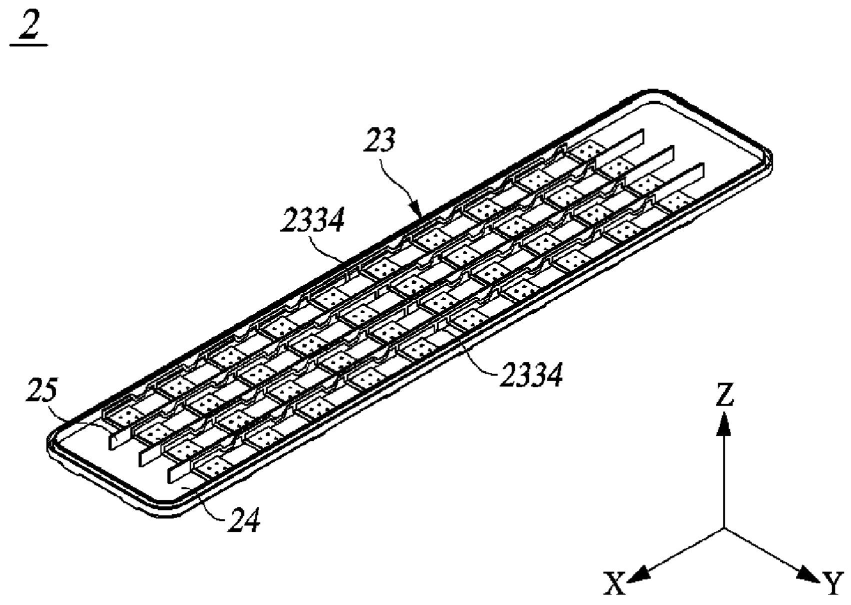
FIG. 6 is a perspective view of an antenna device according to another embodiment of the present disclosure.

FIG. 6 is a perspective view of an antenna device 2 according to another embodiment of the present disclosure.

Referring to FIG. 6, the antenna device 2 may include an antenna assembly 23, a plate 24, and a partition wall 25.

Figure 7:
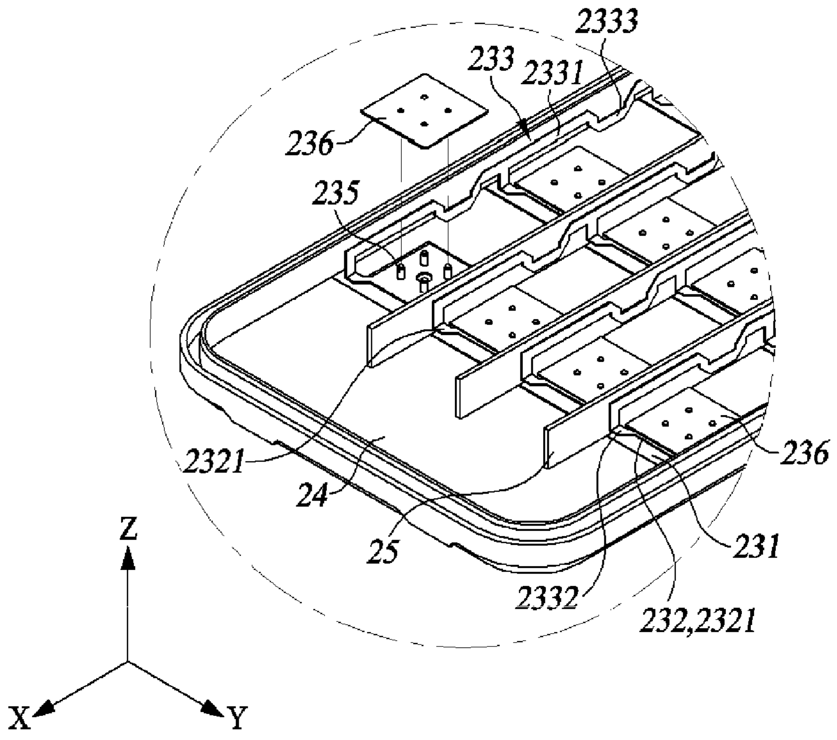
FIG. 7 is an enlarged view of a partial region of FIG. 6.

At least one antenna assembly 23 may include a plurality of radiating elements (2321 in FIG. 7). For example, at least one antenna assembly 23 may include ten radiating elements 2321, but the present disclosure is not limited thereto.

Unlike the antenna device 1 according to one embodiment of the present disclosure, in the antenna device 2 according to another embodiment of the present disclosure, one antenna assembly 23 may form one antenna column.

When the intermediate frequency of the operating frequency band is represented by λ, within one antenna column, an interval in the first direction between one radiating element 2321 and the neighboring radiating element 2321 may be 0.8λ to 0.9λ. However, the present disclosure is not limited thereto.

The antenna device 2 may include a plurality of antenna columns. The plurality of antenna columns may be disposed along the second direction perpendicular to the first direction on the plate 24.

When the intermediate frequency of the operating frequency band is represented by λ, the interval in the second direction between one antenna column and the neighboring antenna column may be 0.5λ, but the present disclosure is not limited thereto.

At least one antenna assembly 23 may be disposed on the plate 24. The plate 24 may be made of a metal material and may provide the ground plane to the radiating element (2321 in FIG. 7) of the antenna assembly 23.

The partition wall 25 may rise from the plate 24 in a direction perpendicular to the plate 24. Specifically, the partition wall 25 may rise from the plate 24 in a direction parallel to the Z axis of FIG. 6.

The partition wall 25 may extend long along the first direction between the antenna columns. The partition wall 25 may be made of a metal material, and ground planes may be provided on two main line regions (2331 in FIG. 7) adjacent to both side surfaces of the partition wall 25.

The plate 24 and the partition wall 25 may be integrally formed. For example, the plate 24 and the partition wall 25 may be integrally manufactured through a single mold. However, the present disclosure is not limited thereto.

FIG. 7 is an enlarged view of a partial region of FIG. 6.

Referring to FIG. 7, the antenna assembly 23 may include a base 231, an antenna group 232, a feed line 233, and a director 236.

The base 231 according to another embodiment of the present disclosure may be formed by injection onto the plate 24. In this case, the base 231 may be made of a dielectric material, for example, a plastic material.

A plurality of bases 231 may be arranged in a line along the first direction. In this case, the plurality of bases 231 may form one base column. The plurality of bases 231 may form a plurality of base columns arranged side by side in the second direction.

The antenna group 232, the feed line 233, and the like may be disposed on the base 231. One radiating element 2321 may be disposed on each base 231 of the plurality of bases 231. However, the present disclosure is not limited thereto, and two or more radiating elements 2321 may be disposed on one base 231.

The base 231 may be disposed between the radiating element 2321 and the plate 24 to separate the radiating element 2321 from the plate 24.

The antenna group 232 may include a plurality of radiating elements 2321 disposed on the base 231 along the first direction. For example, the antenna group 232 may include ten radiating elements 2321, but the present disclosure is not limited thereto.

Each radiating element 2321 of the plurality of radiating elements 2321 may be configured to implement dual polarization. For example, two types of polarized signals of +45 degrees and −45 degrees may be radiated from one radiating element 2321.

The feed line 233 may be configured to feed power to the plurality of radiating elements 2321 included in the antenna group 232. That is, the plurality of radiating elements 2321 may transmit/receive signals or receive power through the feed line 233.

The feed line 233 may have an air-strip structure.

The feed line 233 may include a main line region 2331, a plurality of connection line regions 2332, and an input/output region (2334 in FIG. 6).

The main line region 2331 may be disposed on the side surface of the antenna group 232, for example, on both side surfaces of the antenna group 232, and may extend long along the first direction.

The plurality of connection line regions 2332 may have one end connected to the plurality of radiating elements 2321 and the other end connected to the main line region 2331. The main line region 2331 may be bent at a predetermined angle at the other end of the connection line region 2332. For example, the main line region 2331 may be formed in a direction perpendicular to the base 231, that is, in a direction parallel to the Z-axis with reference to FIG. 7. However, the present disclosure is not limited thereto, and the main line region 2331 may be formed obliquely with respect to the base 231.

The main line region 2331 may be spaced apart from the partition wall 25. Since the main line region 2331 has an air-strip structure, an empty space may be formed between the main line region 2331 and the partition wall 25.

However, in order to fix the main line region 2331, an insulating support (not illustrated) may be partially formed between the partition wall 25 and the main line region 2331.

The plurality of connection line regions 2332 may branch from the main line region 2331, and each connection line region 2332 may be connected to the corresponding radiating element 2321.

Through this, the plurality of connection line regions 2332 may connect the main line region 2331 and each radiating element 2321 of the plurality of radiating elements 2321.

The plurality of connection line regions 2332 may extend from the main line region 2331 in a bent state. In this case, the plurality of connection line regions 2332 may be parallel to the base 231.

The input/output region 2334 may connect the RF circuit and the main line region 2331.

Specifically, one end of the input/output region 2334 may be connected to the main line region 2331, and the other end of the input/output region 2334 may be connected to the RF circuit provided with a filter, a power amplifier, a power supply unit, and the like.

The RF circuit may be provided inside the antenna device 2, but may also be provided in a device outside the antenna device 2, for example, a remote radio head (RRH). When the RF circuit is provided in an external device such as an RRH, the antenna device 2 and the external device provided with the RF circuit may be connected through an RF cable or connector.

The input/output region 2334 may transmit the signal transmitted from the RF circuit to the plurality of radiating elements 2321 or transmit the signal received from the plurality of radiating elements 2321 to the RF circuit through the main line region 2331 and the connection line region 2332. Moreover, the input/output region 2334 may supply power to the plurality of radiating elements 2321 through the main line region 2331 and the connection line region 2332.

In order to minimize a phase difference or power loss that may occur due to an increase in the length of the transmission line, the input/output region 2334 may be disposed near the middle region of the main line region 2331.

The main line region 2331 may include a delay line 2333. The delay line 2333 is a region formed by bending a portion of the main line region 2331, and may partially compensate for the length of the longer feed line 233.

The delay line 2333 may be formed in at least a part of the main line region 2331 connecting two adjacent connection line regions 2332.

The delay line 2333 may have a shape recessed toward the base 231 or a shape protruding away from the base 231. For example, the delay line 2333 may have a "c" shape, but the present disclosure is not limited thereto.

The plurality of radiating elements 2321 may have a patch antenna structure. The plurality of connection line regions 2332 may be integrally formed with the plurality of radiating elements 2321 having a patch antenna structure.

Each director 236 of the plurality of directors 236 may be disposed above each radiating element 2321 of the plurality of radiating elements 2321.

The antenna assembly 23 may additionally include a second support structure 235.

The plurality of directors 236 may be supported by the second support structure 235.

The plurality of second support structures 235 are integrally formed with the base 231 and may protrude from the base 231.

The plurality of second support structures 235 may be overlapped with the radiating element 2321. In this case, the second support structure 235 may pass through the radiating element 2321.

The plurality of directors 236 may be welded while seated on the second support structure 235, but the present disclosure is not limited thereto.

The antenna device 2 may additionally include an upper housing (not illustrated) functioning as a radome and a lower housing (housing) coupled with the upper housing.

The upper housing and the lower housing may form an external shape of the antenna device 2. The upper housing and the lower housing may define an accommodating space therein, and components such as the antenna assembly 23 may be accommodated in the accommodating space.

Meanwhile, in the antenna device 2, the plate 24 may function as a lower housing without a separate lower housing. In this case, by combining the upper housing with the plate 24, the accommodating space may be formed therein.

Still another embodiment of the present disclosure illustrated in FIGS. 8 and 9 to be described later is different from one embodiment of the present disclosure illustrated in FIGS. 1 to 5 in that a feed line having an air-strip structure is disposed between a base plate and a cover plate. Hereinafter, a description will be given focusing on differentiated features from still another embodiment of the present disclosure, and repeated description of components substantially the same as those of one embodiment of the present disclosure will be omitted.

Figure 8:
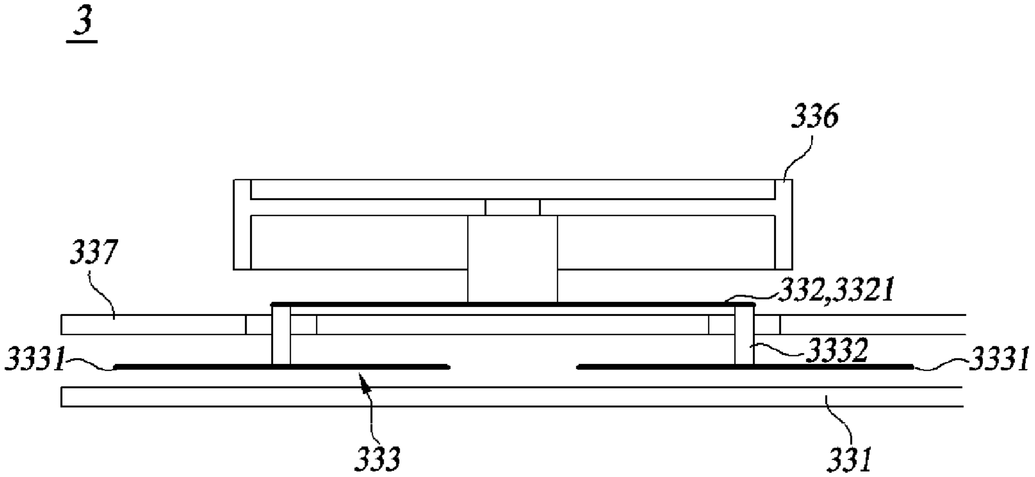
FIG. 8 is a cross-sectional view of an antenna device according to still another embodiment of the present disclosure.

FIG. 8 is a cross-sectional view of an antenna device 3 according to still another embodiment of the present disclosure.

Figure 9:
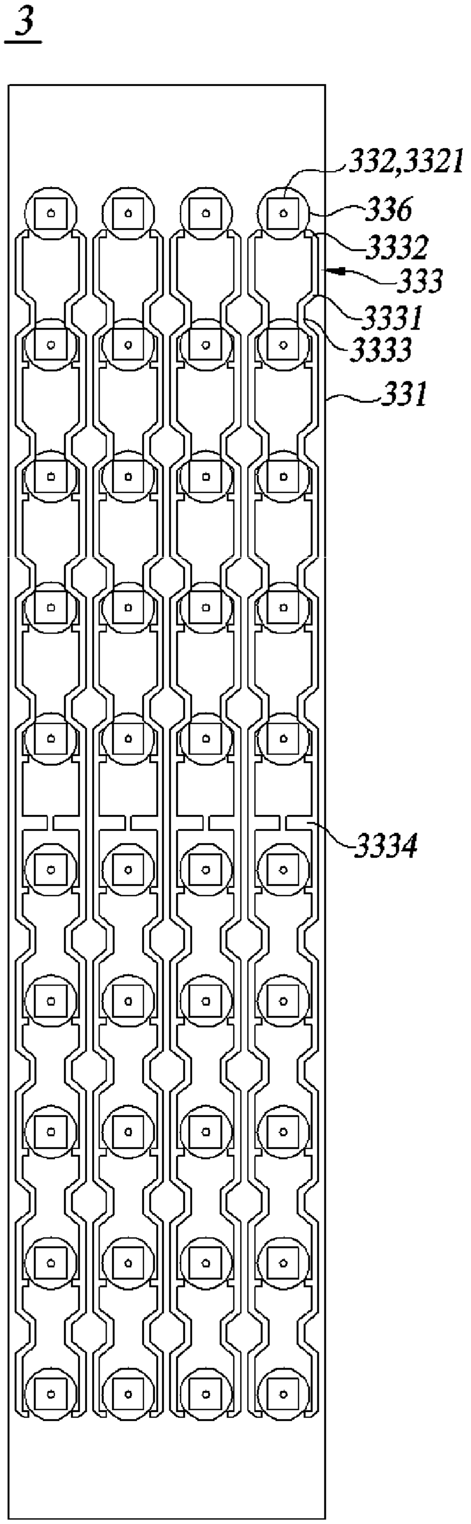
FIG. 9 is a top view of an antenna device according to still another embodiment of the present disclosure.

FIG. 9 is a top view of an antenna device 3 according to still another embodiment of the present disclosure. In FIG. 9, for convenience of explanation, a cover plate 337 is omitted.

Referring to FIGS. 8 and 9, the antenna device 3 includes a base plate 331, the cover plate 337, an antenna group 332, a feed line 333, and a director 336.

An antenna group 332 may be disposed on the base plate 331. The base plate 331 may be made of a metal material, and may provide a ground plane to a radiating element 3321 and a first line region 3331 of the feed line 333.

The cover plate 337 is a cover plate 337 facing the base plate 331 and is spaced apart from the base plate 331.

The cover plate 337 may be made of a metal material, and together with the base plate 331, may provide a ground plane to the radiating element 3321 and the first line region 3331 of the feed line 333.

The antenna group 332 includes the plurality of radiating elements 3321 disposed along the first direction on the cover plate 337. For example, the antenna group 332 may include ten radiating elements 3321, but the present disclosure is not limited thereto.

When the intermediate frequency of the operating frequency band is represented by λ, within one antenna column, an interval in the first direction between one radiating element 3321 and the neighboring radiating element 3321 may be 0.8λ to 0.9λ. However, the present disclosure is not limited thereto.

The antenna device 3 may include a plurality of antenna columns. The plurality of antenna columns may be disposed along the second direction perpendicular to the first direction on the cover plate 337.

When the intermediate frequency of the operating frequency band is represented by λ, the interval in the second direction between one antenna column and the neighboring antenna column may be 0.5λ, but the present disclosure is not limited thereto.

Each radiating element 3321 of the plurality of radiating elements 3321 may be configured to implement dual polarization. For example, two types of polarized signals of +45 degrees and −45 degrees may be radiated from one radiating element 3321.

The feed line 333 may be configured to feed power to the plurality of radiating elements 3321. That is, the plurality of radiating elements 3321 may transmit/receive signals or receive power through the feed line 333.

The feed line 333 may include a first line region 3331, a second line region 3332, and an input/output region 3334.

The first line region 3331 may be disposed between the base plate 331 and the cover plate 337. Specifically, two first line regions 3331 may be disposed side by side between the base plate 331 and the cover plate 337, and the two first line regions 3331 may extend long along the first direction.

The first line region 3331 may have an air-strip structure spaced apart from the base plate 331 and the cover plate 337, respectively.

Accordingly, the first line region 3331 may be spaced apart from the base plate 331 and the cover plate 337, and an empty space may be formed between the first line region 3331 and the plates 331 and 337.

In the antenna device 3 according to still another embodiment of the present disclosure, the first line region 3331 is disposed between the base plate 331 and the cover plate 337, and thus, at least a portion of the first line region 3331 can be overlapped with the radiating element 3321.

Accordingly, even when the area of the feed line 333 compared to the radiating element 3321 increases, the distance between the radiating elements 3321 in the second direction can be sufficiently narrowed.

In the antenna device 3 according to still another embodiment of the present disclosure, the cover plate 337 is disposed between the radiating element 3321 and the first line region 3331, and thus, the radiating element 3321 and the first line region 3331 can be spatially separated. Accordingly, the amount of interference between the radiating element 3321 and the first line region 3331 can be reduced.

The second line region 3332 may pass through the cover plate 337 and may connect the first line region 3331 to each radiating element 3321 of the plurality of radiating elements 3321.

The input/output region 3334 may connect the RF circuit and the first line region 3331.

One end of the input/output region 3334 may be connected to the first line region 3331, and the other end of the input/output region 3334 may be connected to an RF circuit provided with a filter, a power amplifier, a power supply unit, and the like.

The RF circuit may be provided inside the antenna device 3, but may also be provided in a device outside the antenna device 3, for example, a remote radio head (RRH). When the RF circuit is provided in an external device such as RRH, the antenna device 3 and the external device provided with the RF circuit may be connected through an RF cable or connector.

The input/output region 3334 may transmit the signal transmitted from the RF circuit to the plurality of radiating elements 3321 or transmit the signal received from the plurality of radiating elements 3321 to the RF circuit through the first line region 3331 and the second line region 3332. Moreover, the input/output region 3334 may supply power to the plurality of radiating elements 3321 through the first line region 3331 and the second line region 3332.

In order to minimize a phase difference or power loss that may occur due to an increase in the length of the transmission line, the input/output region 3334 may be disposed near the middle region of the first line region 3331.

When the intermediate frequency of the operating frequency band is represented by λ, the length of the feed line 333 required to input signals of the same phase to two neighboring radiating elements 3321 in the first direction may be 1λ. That is, the length of the feed line 333 to two neighboring second line regions 3332 may be 1λ.

However, as described above, an interval in the first direction between the two radiating elements 3321 may have a value of 0.8λ to 0.9λ, and in this case, the length of the feed line connecting the two radiating elements 3321 may be longer than the distance between the two radiating elements 3321, which may cause a problem.

To solve this problem, the first line region 3331 may include a delay line 3333. The delay line 3333 is a region formed by bending a part of the first line region 1331, and may partially compensate for the length of the longer feed line 333.

The delay line 3333 may be formed in at least a part of the first line region 3331 connecting two adjacent connection line regions 3332.

The delay line 3333 may have an inwardly recessed shape or an outwardly protruding shape. For example, the delay line 3333 may have a "c" shape, but the present disclosure is not limited thereto.

The plurality of radiating elements 3321 may have a patch antenna structure, but the present disclosure is not limited thereto. For example, the plurality of radiating elements 3321 may have a structure other than a patch antenna, for example, a dipole antenna structure.

Each director 336 of the plurality of directors 336 may be disposed above each radiating element 3321 of the plurality of radiating elements 3321. The director 336 is disposed in front of the radiating element 3321 in the radial direction, thereby widening an operating frequency band and improving antenna gain.

The antenna device 3 may additionally include an upper housing (not illustrated) functioning as a radome and a lower housing (housing) coupled with the upper housing.

The upper housing and the lower housing may form an external shape of the antenna device 3. The upper housing and the lower housing may define an accommodating space therein, and components such as the base plate 331, the cover plate 337, the antenna group 332, the feed line 333, the director 336 may be accommodated in the accommodating space.

Meanwhile, in the antenna device 3, the base plate 331 may function as a lower housing without a separate lower housing. In this case, by combining the upper housing (not illustrated) with the base plate 331, an accommodating space may be defined therein.

Still another embodiment of the present disclosure illustrated in FIGS. 10 to 12 which will be described later is different from an embodiment of the present disclosure illustrated in FIGS. 1 to 5 in that a feed line having an air-strip structure is not physically connected to a radiating element and a coupling method is used. Hereinafter, a description will be given focusing on differentiated features from still another embodiment of the present disclosure, and repeated description of components substantially the same as those of one embodiment of the present disclosure will be omitted.

Figure 10:
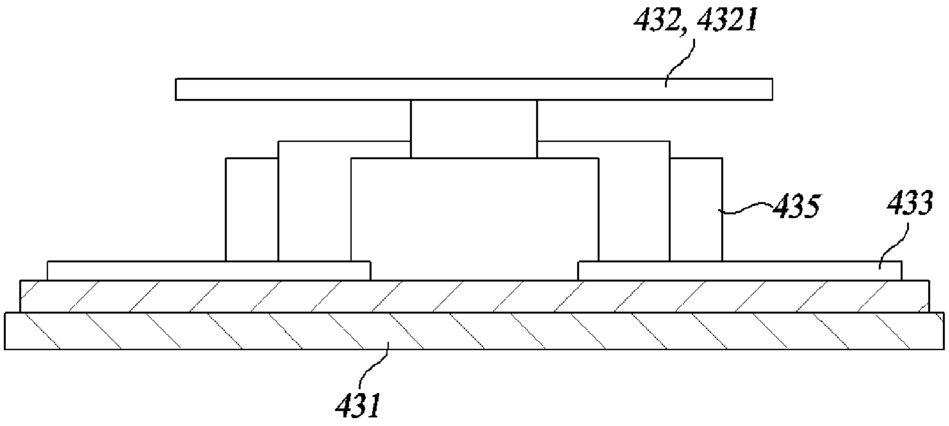
FIG. 10 is a cross-sectional view of an antenna device according to still another embodiment of the present disclosure.

FIG. 10 is a cross-sectional view of an antenna device 4 according to still another embodiment of the present disclosure.

Figure 11:
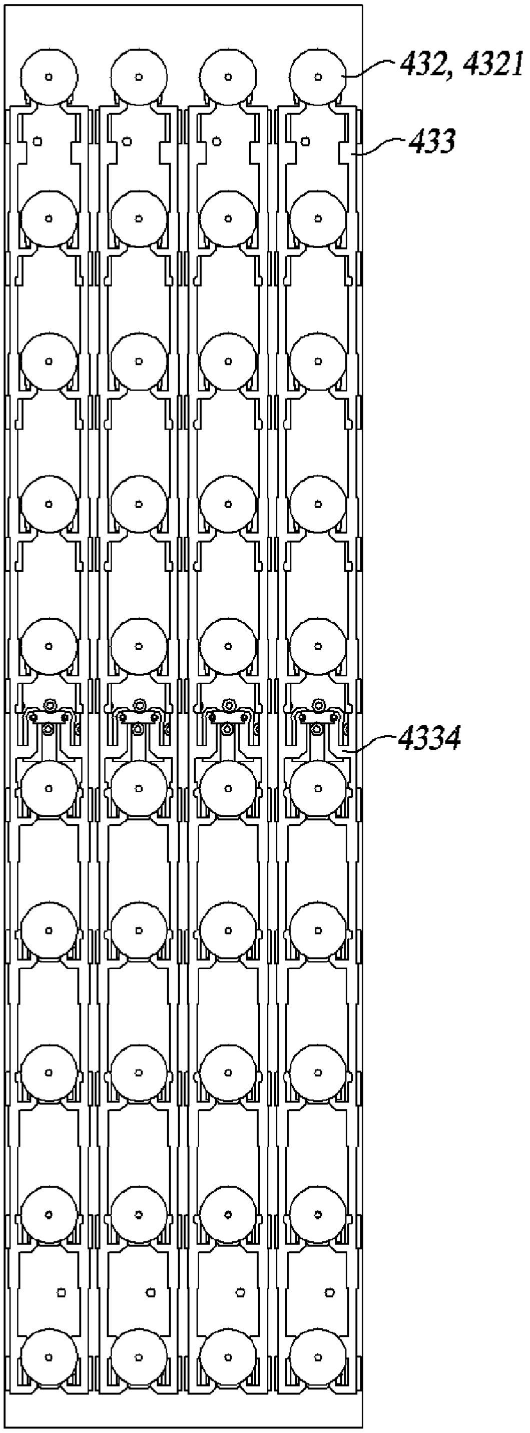
FIG. 11 is a top view of an antenna device according to still another embodiment of the present disclosure.

FIG. 11 is a top view of the antenna device 4 according to still another embodiment of the present disclosure.

Figure 12:
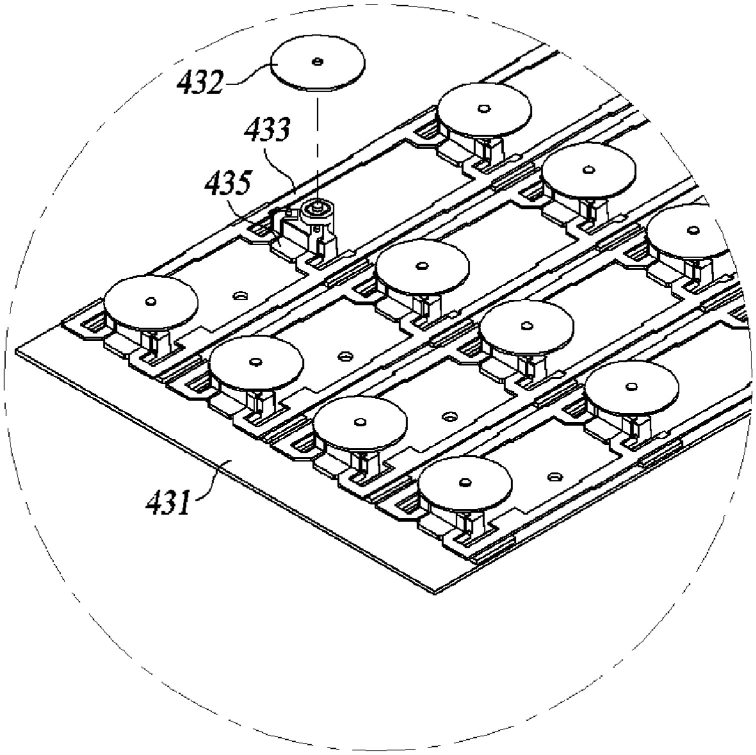
FIG. 12 is an enlarged view of a partial region of FIG. 11.

FIG. 12 is an enlarged view of a partial region of FIG. 11.

Referring to FIGS. 10 to 12, the antenna device 4 includes a base plate 431, an antenna group 432, a feed line 433, and a second support structure 435.

An antenna group 432 may be disposed on the base plate 431. The base plate 331 may be made of a metal material and may provide a ground plane to the radiating element 4321 and the feed line 433.

The antenna group 432 includes a plurality of radiating elements 4321 disposed on the base plate 431 along the first direction. For example, the antenna group 432 may include ten radiating elements 4321, but the present disclosure is not limited thereto.

When the intermediate frequency of the operating frequency band is represented by λ, within one antenna column, an interval in the first direction between one radiating element 4321 and the neighboring radiating element 4321 may be 0.8λ to 0.9λ. However, the present disclosure is not limited thereto.

The antenna device 4 may include a plurality of antenna columns. The plurality of antenna columns may be disposed along the second direction perpendicular to the first direction on the base plate 431.

When the intermediate frequency of the operating frequency band is represented by λ, the interval in the second direction between one antenna column and the neighboring antenna column may be 0.5λ, but the present disclosure is not limited thereto.

Each radiating element 4321 of the plurality of radiating elements 4321 may be configured to implement dual polarization. For example, two types of polarized signals of +45 degrees and −45 degrees may be radiated from one radiating element 3321.

The feed line 433 may be configured to feed power to the plurality of radiating elements 4321. That is, the plurality of radiating elements 4321 may transmit/receive signals or receive power through the feed line 433. Referring to FIG. 12, the plurality of radiating elements 4321 are disposed on the support structure 435 but are not physically connected to the feed line 433 and may be configured to be powered by a coupling method.

The feed line 433 may be disposed between the base plate 431 and the antenna group 432. Specifically, the two feed lines 433 may be disposed parallel to each other between the base plate 431 and the antenna group 432, and the two feed lines 433 may extend long along the first direction.

The support structure 435 may support the feed line 433 and the antenna group 432. The support structure 435 may be coupled to the base plate 431 or integrally formed with the base plate 431. The support structure 435 may include a plurality of protrusions that may be connected to the antenna group 432 and the feed line 433. The support structure 435 may include a stair-shaped first support portion supporting the feed line 433 and a cylindrical second support portion supporting the antenna group 432.

The feed line 433 is supported by the support structure 435 and may have an air-strip structure spaced apart from the base plate 431 and the antenna group 432, respectively. The feed line 433 may include a portion bent to correspond to the shape of the support structure 435 so as to be supported by the support structure 435.

In the antenna device 4 according to still another embodiment of the present disclosure, by disposing the feed line 433 between the base plate 431 and the antenna group 432, at least a portion of the feed line 433 may be overlapped with the radiating element.

Accordingly, even when the area of the feed line 433 is increased compared to the radiating element 4321, the distance between the radiating elements 4321 in the second direction can be sufficiently narrowed.

In the antenna device 4 according to still another embodiment of the present disclosure, the radiating element 4321 is not physically connected to the feed line 433 and is configured to be fed by a coupling method, and thus, the radiating element 4321 and the feed line 433 may be spatially separated. Therefore, the amount of interference between the radiating element 4321 and the feed line 433 can be reduced.

The input/output area 4334 may connect the RF circuit and the feed line 433.

One end of the input/output region 4334 may be connected to the feed line 433, and the other end of the input/output region 4334 may be connected to an RF circuit provided with a filter, a power amplifier, a power supply unit, and the like.

The RF circuit may be provided inside the antenna device 4, but may also be provided in a device outside the antenna device 4, for example, a remote radio head (RRH). When the RF circuit is provided in an external device such as an RRH, the antenna device 4 and the external device provided with the RF circuit may be connected through an RF cable or connector.

The input/output region 4334 may transfer the signal transmitted from the RF circuit through the feed line 433 to the plurality of radiating elements 4321 or transmit the signal received from the plurality of radiating elements 4321 to the RF circuit. Moreover, the input/output area 4334 may supply power to the plurality of radiating elements 4321 through the feed line 433.

In order to minimize a phase difference or power loss that may occur due to an increase in the length of the transmission line, the input/output area 4334 may be disposed near the middle area of the feed line 433.

When the intermediate frequency of the operating frequency band is represented by λ, the length of the feed line 433 required to input signals of the same phase to two neighboring radiating elements 4321 in the first direction may be 1λ.

The plurality of radiating elements 4321 may have a patch antenna structure, but the present disclosure is not limited thereto. For example, the plurality of radiating elements 4321 may have a structure other than a patch antenna, for example, a dipole antenna structure.

The antenna device 4 may additionally include an upper housing (not illustrated) functioning as a radome and a lower housing (housing) coupled with the upper housing.

The upper housing and the lower housing may form an external shape of the antenna device 4. The upper housing and the lower housing may define an accommodating space therein, and components such as the base plate 431, the antenna group 432, and the feed line 433 may be accommodated in the accommodating space.

Meanwhile, in the antenna device 4, the base plate 431 may function as the lower housing without a separate lower housing. In this case, by combining the upper housing (not illustrated) with the base plate 431, the accommodating space may be defined therein. Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

REFERENCE NUMERALS

1: antenna device, 13: antenna assembly, 14: plate, 15: partition wall, 131: base, 132: antenna group, 133: feed line, 134: first support structure, 135: second support structure, 136: director, 1321: radiating element, 1331: main line region, 1332: connection line region, 1333: delay line

The invention claimed is:

1. An antenna assembly comprising:

a base;

an antenna group including a plurality of radiating elements disposed on the base along a first direction; and a feed line configured to feed power to the plurality of radiating elements, the feed line having an air-strip structure, wherein the feed line includes:

a plurality of connection line regions configured such that one end of each of the plurality of connection line regions is connected to each radiating element of the plurality of radiating elements, and a main line region bent at a predetermined angle at the other end of each of the plurality of connection line regions and formed along the first direction from a side surface of the antenna group, wherein each of the plurality of connection line regions is formed parallel to the base.

2. The antenna assembly of claim 1, wherein the main line region is bent in a direction perpendicular to each of the plurality of connection line regions.

3. The antenna assembly of claim 1, wherein the plurality of radiating elements include a first radiating element and a second radiating element adjacent to the first radiating element, the plurality of connection line regions include a first connection line region connected to the first radiating element and a second connection line region connected to the second radiating element, and the main line region includes a delay line formed in at least a part of the main line region connecting between the first connection line region and the second connection line region.

4. The antenna assembly of claim 3, wherein the delay line has a shape recessed toward the base or a shape protruding away from the base.

5. The antenna assembly of claim 1, wherein the plurality of connection line regions are formed integrally with the plurality of radiating elements.

6. The antenna assembly of claim 1, further comprising at least one first support structure formed integrally with the base and protruding from the base, wherein the main line region is supported by the at least one first support structure.

7. The antenna assembly of claim 1, further comprising a plurality of directors disposed above the respective radiating elements of the plurality of radiating elements.

8. The antenna assembly of claim 7, further comprising a plurality of second support structures formed integrally with the base and protruding from the base, wherein the plurality of directors are supported through the plurality of second support structures.

9. An antenna device comprising:

the first antenna assembly and the second antenna assembly according to claim 1;

a plate configured to seat the first antenna assembly and the second antenna assembly side by side in a second direction perpendicular to the first direction; and a partition wall rising from the plate between the first antenna assembly and the second antenna assembly.

10. The antenna device of claim 9, wherein the feed line of the first antenna assembly includes a first main line region adjacent to the second antenna assembly, the feed line of the second antenna assembly includes a second main line region adjacent to the first antenna assembly, and the partition wall is disposed between the first main line region and the second main line region.

11. The antenna device of claim 9, wherein the partition wall is integrally formed with the plate.

12. The antenna device of claim 10, wherein the partition wall is disposed to be spaced apart from the first main line region and the second main line region.

13. An antenna device comprising:

at least one antenna assembly according to claim 1; and a plate configured to seat the at least one antenna assembly, wherein the at least one antenna assembly is modularized and mounted on the plate.

* * * * *